(12) United States Patent
Asauchi (10) Patent No.: US 10,948,343 B2
(45) Date of Patent: Mar. 16, 2021

(54) OPTICAL MODULE AND ELECTRONIC APPARATUS

(71) Applicant: Seiko Epson Corporation, Tokyo (JP)

(72) Inventor: Noboru Asauchi, Yamagata (JP)

(73) Assignee: Seiko Epson Corporation

( * ) Notice: Subject to any disclaimer, the term of this patent is extended or adjusted under 35 U.S.C. 154(b) by 100 days.

(21) Appl. No.: 16/109,911

(22) Filed: Aug. 23, 2018

(65) Prior Publication Data
US 2019/0063989 A1    Feb. 28, 2019

(30) Foreign Application Priority Data

Aug. 24, 2017 (JP) .............................. JP2017-160892

(51) Int. Cl.
| | |
|---|---|
| *G01J 1/04* | (2006.01) |
| *G01J 3/32* | (2006.01) |
| *G01J 1/02* | (2006.01) |
| *G01J 3/02* | (2006.01) |
| *G01J 1/44* | (2006.01) |

(52) U.S. Cl.
CPC .......... *G01J 1/0437* (2013.01); *G01J 1/0204* (2013.01); *G01J 1/0214* (2013.01); *G01J 1/0488* (2013.01); *G01J 3/0256* (2013.01); *G01J 3/0262* (2013.01); *G01J 3/32* (2013.01); *G01J 1/44* (2013.01)

(58) Field of Classification Search
CPC .......... G01J 1/0437; G01J 1/0204; G01J 3/32; G01J 3/0256; G01J 1/0214; G01J 3/0262; G01J 1/0488; G01J 1/44; G02B 6/12; G02B 7/00

USPC ....................................................... 250/237 R
See application file for complete search history.

(56) References Cited

U.S. PATENT DOCUMENTS

| | | | | |
|---|---|---|---|---|
| 7,488,615 B2 * | 2/2009 | Uya | .................. | H01L 27/14625 257/290 |
| 10,559,616 B2 * | 2/2020 | Uesaka | ............... | H01L 27/1464 |
| 2011/0075143 A1 * | 3/2011 | Shibayama | ............... | G01J 3/02 356/334 |
| 2013/0329225 A1 * | 12/2013 | Shibayama | ............... | G01J 3/02 356/402 |
| 2015/0241270 A1 | 8/2015 | Matsuno et al. | | |

FOREIGN PATENT DOCUMENTS

JP        2015-161511 A      9/2015

* cited by examiner

*Primary Examiner* — Seung C Sohn
(74) *Attorney, Agent, or Firm* — Harness, Dickey & Pierce, P.L.C.

(57) ABSTRACT

An optical module includes a substrate that has a first surface and a second surface opposite to the first surface and provided with a first hole portion having an opening surface on at least the first surface, an optical element that is provided on the substrate, the optical element having an optical axis located along a thickness direction from the first surface toward the second surface and located in the first hole portion, and a first light shielding portion that is provided on an inner peripheral surface which intersects the opening surface of the first hole portion and has a higher light shielding property than the substrate.

11 Claims, 7 Drawing Sheets

OPTICAL MODULE AND ELECTRONIC APPARATUS

BACKGROUND

1. Technical Field

The present invention relates to an optical module and an electronic apparatus.

2. Related Art

In the related art, there is known an optical module in which an optical element such as a light receiving element is provided on a circuit substrate (for example, JP-A-2015-161511).

In the optical module of JP-A-2015-161511, a wavelength tunable interference filter is provided on one side of the circuit substrate. Furthermore, a concave portion is provided on one surface side of the circuit substrate, and an optical sensor (light receiving element) for receiving the light transmitted through the wavelength tunable interference filter is provided in the concave portion.

Meanwhile, in the optical module as disclosed in JP-A-2015-161511, a glass epoxy substrate in which glass fibers are impregnated with epoxy resin or the like is sometimes used as a circuit substrate. Such a glass epoxy substrate has light-transmittance. Normally, a resist is formed on the front and back surfaces of a substrate the circuit substrate, but light may be incident into the circuit substrate from the side surface of the substrate. In this case, light incident into the circuit substrate may pass through the inside of the circuit substrate and be emitted into the concave portion. In this case, there is a problem that not only light passing through the wavelength tunable interference filter but also light (stray light) passing through the inside of the circuit substrate and emitted into the concave portion is also received by the optical sensor, and the light amount of light may not be detected with high accuracy.

SUMMARY

An advantage of some aspects of the invention is to provide an optical module and an electronic apparatus capable of improving the optical accuracy.

An optical module according to an application example of the invention includes a substrate that has a first surface and a second surface opposite to the first surface and provided with a first hole portion having an opening surface on at least the first surface, an optical element that is provided on the substrate, the optical element having an optical axis located along a thickness direction from the first surface toward the second surface and located in the first hole portion, and a first light shielding portion that is provided on an inner peripheral surface which intersects the opening surface of the first hole portion and has a higher light shielding property than the substrate.

In this application example, the first light shielding portion is provided on the inner peripheral surface of the first hole portion. Therefore, even in a case where light is incident into the substrate from the side surface of the substrate, since the light that passes through the inside of the substrate and travels toward the first hole portion is shielded by the first light shielding portion, the light is suppressed from being emitted into the first hole portion. In this way, it is possible to suppress the light that passes through the inside of the substrate and is emitted into the first hole portion from entering the light passing through the first hole portion along the optical axis, thereby improving the optical accuracy.

In the optical module of the application example, it is preferable that the substrate is provided between the first surface and the second surface on the outer peripheral side of the substrate with respect to the first hole portion in a plan view as viewed from the thickness direction and includes a second light shielding portion that shields light in a direction intersecting with the thickness direction.

In the application example with this configuration, the substrate includes a second light shielding portion on the outer peripheral side of the substrate with respect to the first hole portion in the plan view. Therefore, it is possible to shield the light traveling from the outside of the second light shielding portion toward the first hole portion by the second light shielding portion inside the substrate, thereby suppressing the light from reaching the first hole portion. In this way, it is possible to suppress the light that passes through the inside of the substrate and is emitted into the first hole portion from entering the light passing through the first hole portion along the optical axis, thereby improving the optical accuracy.

An optical module according to an application example of the invention includes a substrate that has a first surface and a second surface opposite to the first surface and provided with a first hole portion having an opening surface on at least the first surface and an optical element that is provided on the substrate, the optical element having an optical axis located along a thickness direction from the first surface toward the second surface and located in the first hole portion, in which the substrate is provided between the first surface and the second surface on the outer peripheral side of the substrate with respect to the first hole portion in a plan view as viewed from the thickness direction and includes a second light shielding portion that shields light in a direction intersecting with the thickness direction.

According to this application example, even in a case where light is incident into the substrate from the side surface of the substrate, since the light that passes through the inside of the substrate and travels toward the first hole portion is shielded by the second light shielding portion and the first light shielding portion, the light is suppressed from being emitted into the first hole portion. In this way, it is possible to suppress the light that passes through the inside of the substrate and is emitted into the first hole portion from entering the light passing through the first hole portion along the optical axis, thereby improving the optical accuracy.

In the optical module of the application example, it is preferable that the second light shielding portion is provided to surround the periphery of the first hole portion in the plan view.

According to the application example with this configuration, it is possible to suppress the light traveling from the outer periphery of the substrate toward the first hole portion from reaching the first hole portion inside the substrate more reliably.

In the optical module of the application example, it is preferable that the second light shielding portion includes a second hole portion having an opening surface on at least one of the first surface and the second surface of the substrate.

According to the application example with this configuration, light traveling from the outside of the second light shielding portion toward the first hole portion in the substrate may be shielded, for example, by refracting the light by the second hole portion, thereby reducing the amount of light traveling toward the first hole portion.

In the optical module of the application example, it is preferable that the second light shielding portion includes a plurality of the second hole portions arranged at predetermined intervals.

According to the application example with this configuration, for example, the strength of the substrate may be improved as compared with the case where the second light shielding portion is constituted by one second hole portion.

In addition, by setting the predetermined interval to be shorter than the shortest value of the wavelength range of the light passing through the first hole portion along the optical axis, it is possible to reduce the amount of light in the wavelength range travelling from the outside of the second light shielding portion toward the first hole portion through between the second hole portions in the substrate due to the optical characteristics.

In the optical module of the application example, it is preferable that a light shielding member having a higher light shielding property than the substrate is provided in the second hole portion.

In the application example with this configuration, since the light shielding member is provided in the second hole portion, it is possible to shield the light traveling from the outside of the second light shielding portion toward the first hole portion by the light shielding member inside the substrate more reliably.

In the optical module of the application example, it is preferable that the second hole portion penetrates through the substrate.

According to the application example with this configuration, for example, as compared with the case where the second hole portion does not penetrate through the substrate, it is possible to shield the light traveling from the outside of the second light shielding portion toward the first hole portion by the second hole portion inside the substrate more reliably.

An electronic apparatus according to an application example of the invention includes the optical module described above and a controller that controls the optical module.

According to the above optical module, since it is possible to improve the optical accuracy, it is possible to improve accuracy of various kinds of processing using the optical module in an electronic device including the optical module.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to drawings. In the present embodiment, a spectroscopic measurement apparatus 1 as an electronic apparatus including an optical module 10 will be described.

Structure of Spectroscopic Measurement Apparatus

Figure 1:
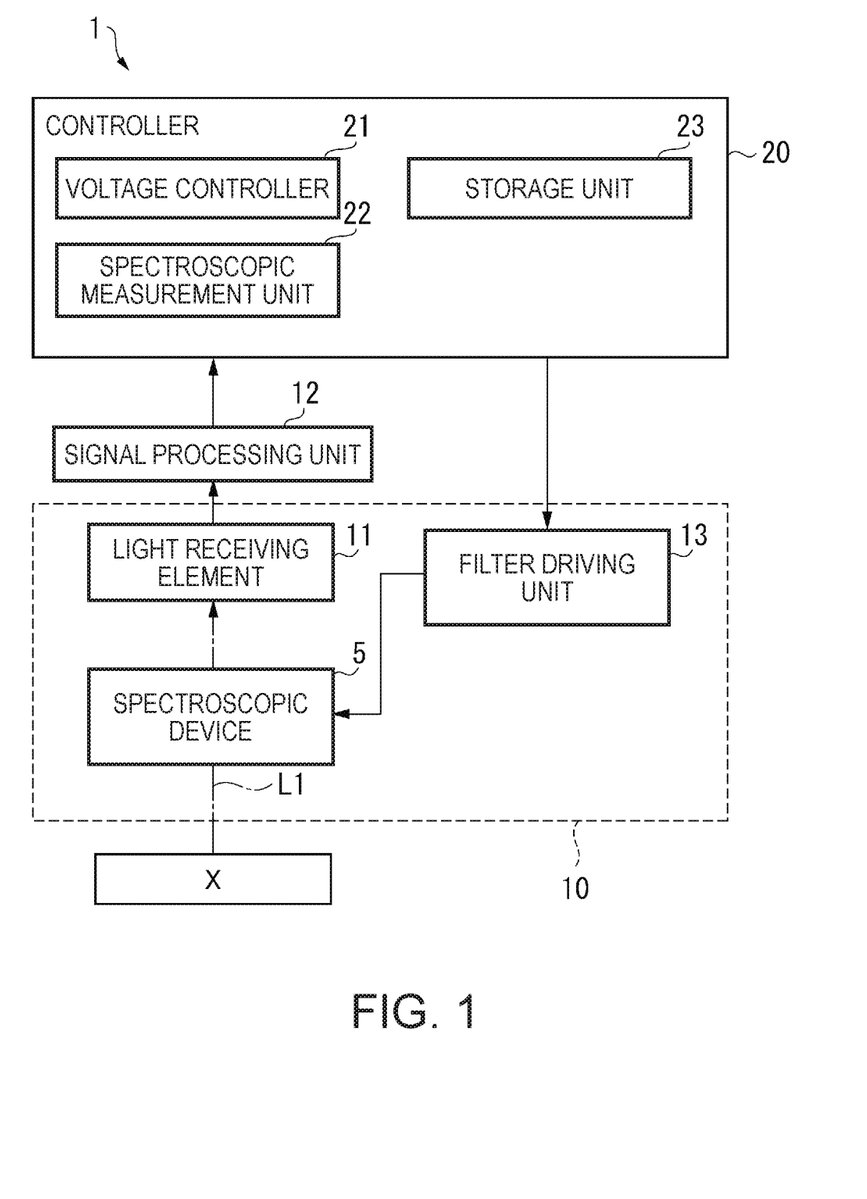
FIG. 1 is a block diagram showing a schematic configuration of a spectroscopic measurement apparatus according to a first embodiment of the invention.

As shown in FIG. 1, the spectroscopic measurement apparatus 1 is configured to include a spectroscopic device 5 and measures a light amount of light of each wavelength in measurement target light reflected by or emitted from a measurement target object X. Specifically, the spectroscopic measurement apparatus 1 includes the optical module 10 including the spectroscopic device 5, a light receiving element 11, and a filter driving unit 13, and a signal processing unit 12 and a controller 20.

The spectroscopic device 5 is configured to include, for example, a spectroscopic element capable of changing a spectral wavelength when light from the measurement target object X is dispersed. In the embodiment, the spectroscopic device 5 is configured to include a wavelength tunable interference filter as a spectroscopic element. Instead of the wavelength tunable interference filter, the spectroscopic device 5 may be configured to include various kinds of spectroscopic elements capable of changing spectral wavelengths such as an acousto-optic tunable filter (AOTF), an LCD tunable filter (LCTF), a grating, and the like.

The light receiving element 11 as the optical element of the invention receives the light transmitted through the spectroscopic device 5 and outputs a light receiving signal (current) corresponding to the light intensity (light amount) of the received light. The light receiving element 11 is constituted by, for example, an image sensor such as a CCD sensor, a photodiode or the like.

The signal processing unit 12 is configured to include, for example, an I-V converter, an amplifier, an A/D converter, and the like. In the signal processing unit 12, the I-V converter converts the light receiving signal input from the light receiving element 11 into a voltage signal, the amplifier amplifies the converted voltage signal, and the A/D converter converts the amplified signal to output a digital signal to the controller 20.

The filter driving unit 13 adjusts the wavelength of light passing through the spectroscopic device 5 by applying a driving voltage to the spectroscopic device 5 and driving the spectroscopic device 5 based on a target command signal input from the controller 20.

The control unit 20 controls the overall operation of the spectroscopic measurement apparatus 1, is configured by combining, for example, a central processing unit (CPU), a memory, and the like, and includes a voltage controller 21, a spectroscopic measurement unit 22, and a storage unit 23.

Various programs and various data for controlling the spectroscopic measurement apparatus 1 are stored in the storage unit 23.

The voltage controller 21 reads the driving voltage corresponding to the target wavelength from the storage unit 23 based on the set target wavelength and outputs a target command signal to the filter driving unit 13.

The spectroscopic measurement unit 22 acquires the light receiving signal output from the light receiving element 11 via the signal processing unit 12 and measures the spectral characteristic of the measurement target light based on the light receiving signal.

Structure of Optical Module

Figure 2:
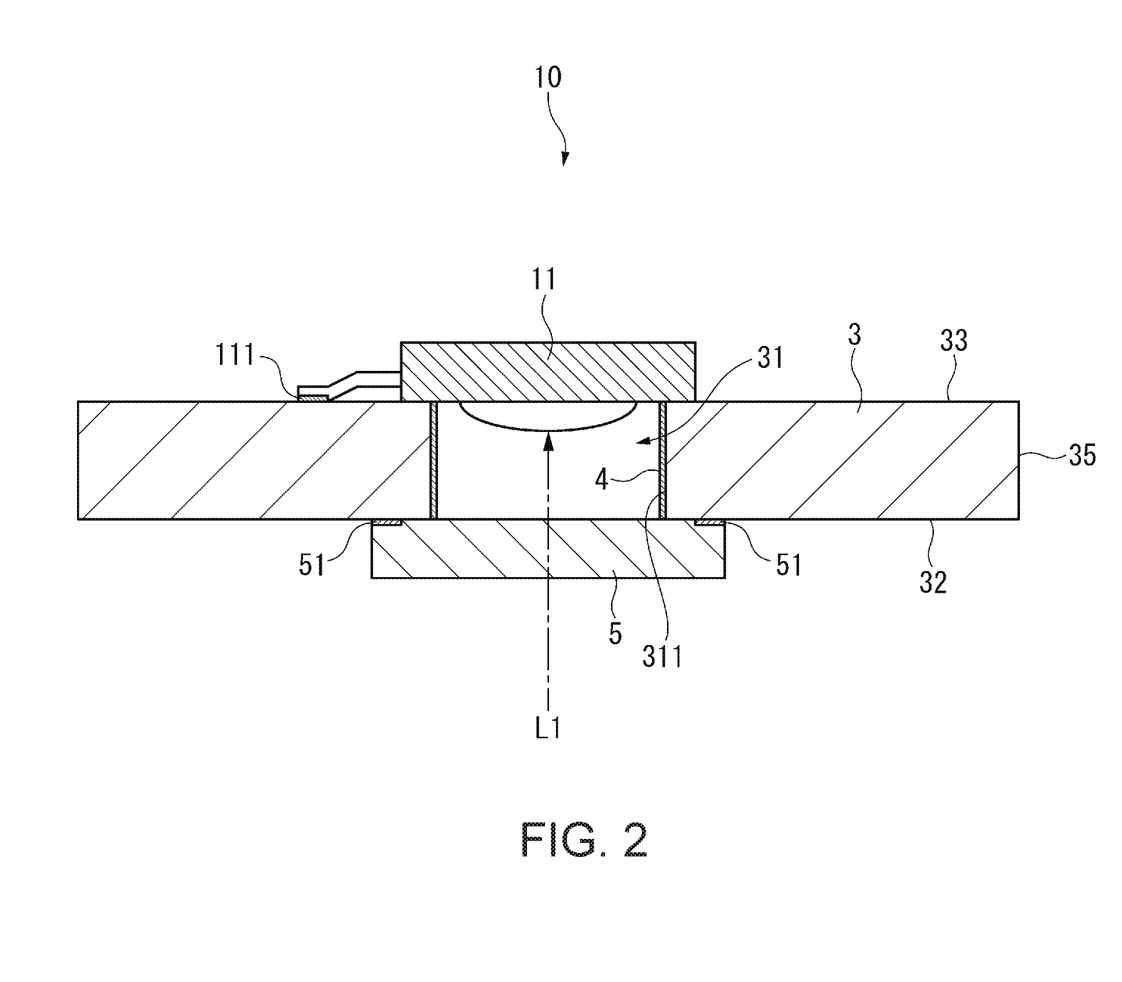
FIG. 2 is a cross-sectional view of an optical module of the first embodiment.
Figure 3:
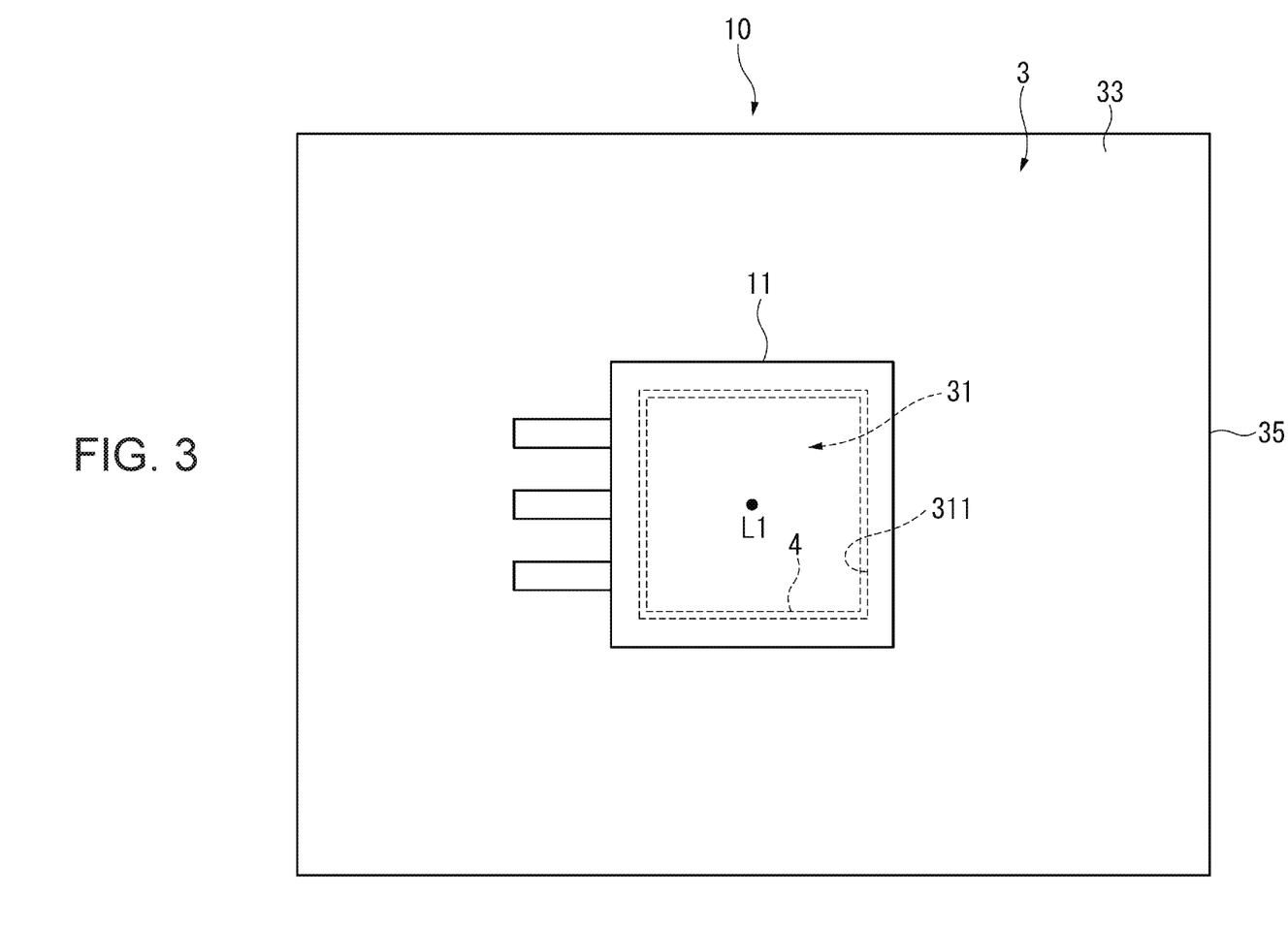
FIG. 3 is a plan view of the optical module according to the first embodiment.

Next, the structure of the optical module 10 will be described with reference to FIGS. 2 and 3. FIG. 2 is a cross-sectional view of the optical module 10, and FIG. 3 is a plan view of the optical module 10.

The optical module 10 is configured by providing the spectroscopic device 5, the light receiving element 11, and the filter driving unit 13 on a wiring substrate 3. The filter driving unit 13 is constituted by a control circuit (not shown) provided on the wiring substrate 3.

For the wiring substrate 3 (the substrate according to the invention), a light transmitting substrate such as a glass epoxy resin or the like is used.

The wiring substrate 3 has a first surface 32 and a second surface 33 opposite to the first surface 32 and is provided with a first hole portion 31 having an opening surface on the first surface 32 and the second surface 33. That is, in the embodiment, the first hole portion 31 is a through hole penetrating the wiring substrate 3. In addition, the first hole portion 31 is formed in a rectangular shape in a plan view viewed from the thickness direction from the first surface 32 to the second surface 33 (hereinafter, referred to as a substrate plan view).

In addition, wirings (not shown) are provided on the first surface 32 and the second surface 33 of the wiring substrate 3, and a resist is provided so as to cover the wirings. With this resist, light is suppressed from being incident into the wiring substrate 3 from the first surface 32 and the second surface 33 of the wiring substrate 3. However, since a resist is not usually provided on a side surface 35 of the wiring substrate 3, light may be incident into the wiring substrate 3 from the side surface 35 in some cases.

Then, in the embodiment, a first light shielding portion 4, which has a higher light shielding property than the wiring substrate 3, is provided on an inner peripheral surface 311 (the surface along the thickness direction of the first hole portion 31) that intersects the opening surface of the first hole portion 31. For example, a resist with a dark color such as black is used for the first light shielding portion 4. For example, it is possible to provide the first light shielding portion 4 by supplying a liquid light shielding material to the inner peripheral surface 311 using a dispenser or the like.

The spectroscopic device 5 is provided on the first surface 32 side of the wiring substrate 3 and overlaps with the first hole portion 31 in a substrate plan view. Then, the spectroscopic device 5 transmits light of a predetermined wavelength out of the light incident along an optical axis L1 of the light receiving element 11 to be described later from the side opposite to the side of the wiring substrate 3 to emit the light into the first hole portion 31.

In addition, the spectroscopic device 5 includes an electrode 51, and the electrode 51 is connected to a wiring provided on the wiring substrate 3. In this way, the spectroscopic device 5 and the filter driving unit 13 provided on the wiring substrate 3 are connected.

The light receiving element 11 is provided on the second surface 33 side of the wiring substrate 3 and overlaps with the first hole portion 31 in the substrate plan view. Here, the light receiving element 11 is provided so that the optical axis L1 is located within the first hole portion 31 and is along the thickness direction.

The light receiving element 11 receives the light transmitted through the spectroscopic device 5 along the optical axis L1 and having passed through the first hole portion 31.

In addition, the light receiving element 11 includes an electrode 111, and the electrode 111 is connected to a wiring provided on the wiring board 3. Through this wiring, the light receiving signal output from the light receiving element 11 is transmitted to the signal processing unit 12.

Operational Effect of the First Embodiment

In the embodiment, the first light shielding portion 4 is provided on the inner peripheral surface 311 of the first hole portion 31. Therefore, even in a case where light is incident into the wiring substrate 3 from the side surface 35 of the wiring substrate 3, since the light that passes through the inside of the wiring substrate 3 and travels toward the first hole portion 31 is shielded by the first light shielding portion 4, the light is suppressed from being emitted into the first hole portion 31. In this way, it is possible to suppress the light that passes through the inside of the wiring substrate 3 and is emitted into the first hole portion 31 from entering the light passing through the inside of the first hole 31 along the optical axis L1, thereby improving the measurement accuracy of the amount of received light.

Second Embodiment

Figure 4:
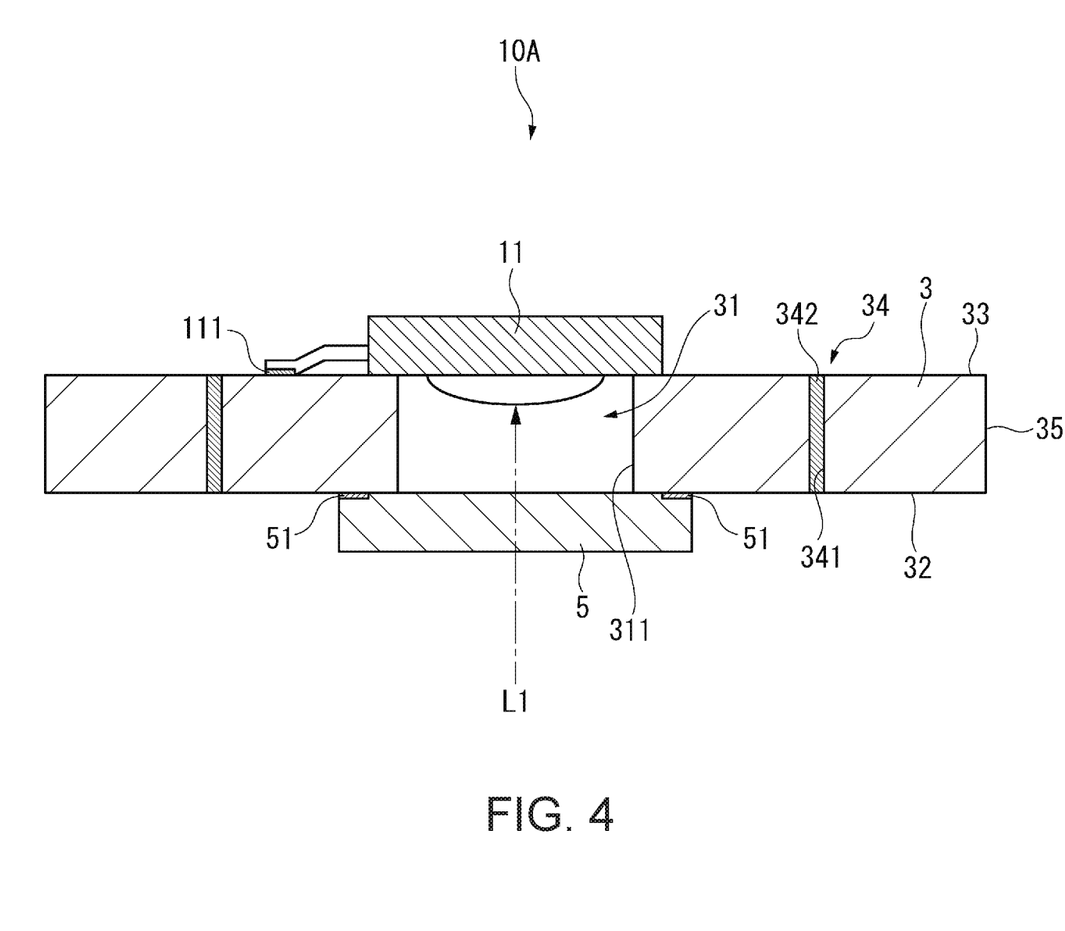
FIG. 4 is a cross-sectional view of an optical module according to a second embodiment of the invention.
Figure 5:
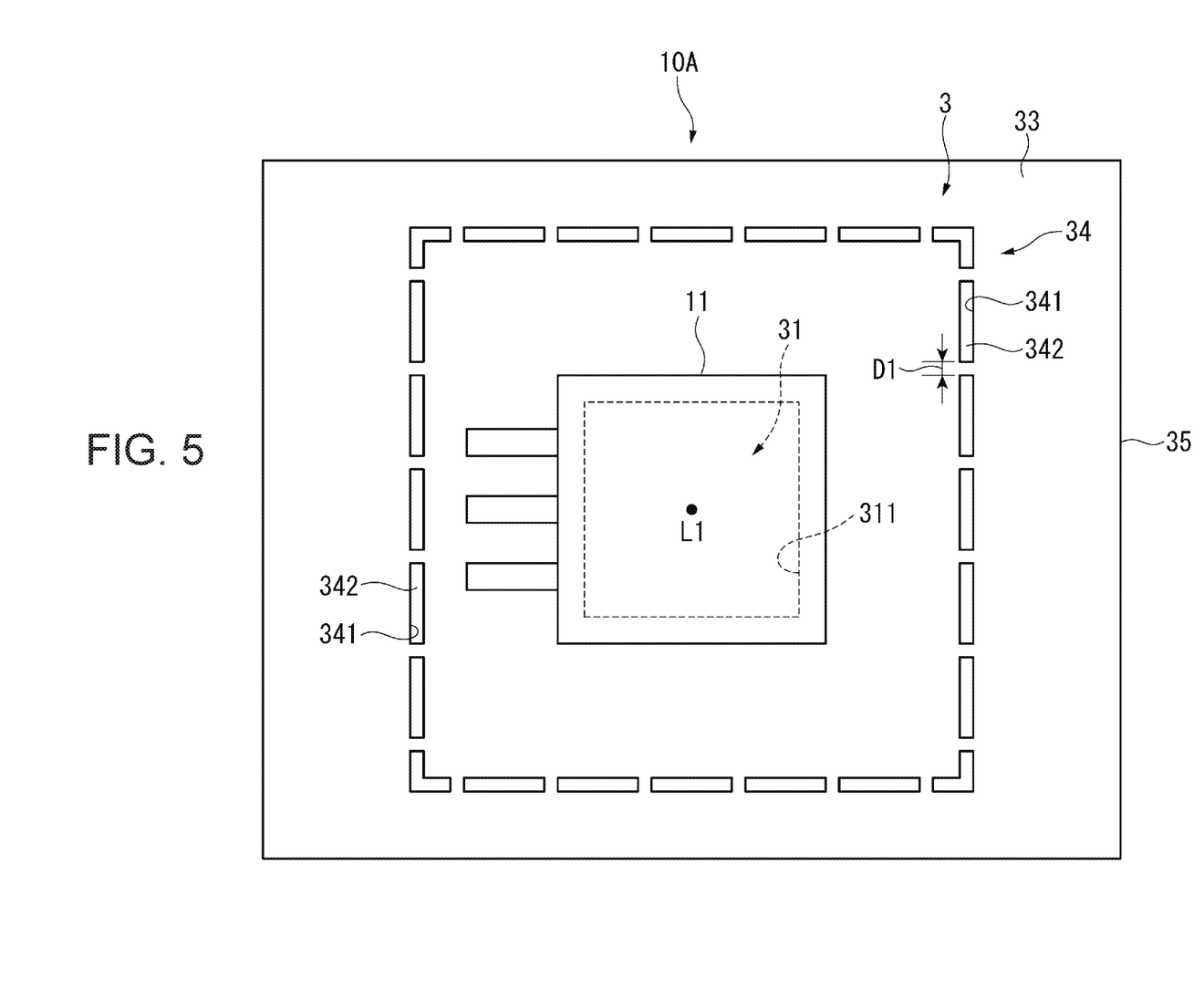
FIG. 5 is a plan view of the optical module according to the second embodiment.

In an optical module 10A of a second embodiment, the first light shielding portion 4 is not provided on the inner peripheral surface 311 of the first hole portion 31. Instead, in the wiring board 3 in the substrate plan view, a second light shielding portion 34 is provided on the outer peripheral side of the wiring substrate 3 with respect to the first hole portion 31. Other configurations are the same as those of the optical module 10 of the first embodiment. The same components as those of the optical module 10 are denoted by the same reference numerals, and description thereof is omitted.

FIG. 4 is a cross-sectional view of the optical module 10A, and FIG. 5 is a plan view of the optical module 10A.

As shown in FIGS. 4 and 5, the wiring substrate 3 of the optical module 10A includes the second light shielding portion 34 that surrounds the periphery of the first hole portion 31 on the outer peripheral side of the wiring substrate 3 with respect to the first hole portion 31 in the substrate plan view. The second light shielding portion 34 is provided between the first surface 32 and the second surface 33 and shields light in a direction intersecting the thickness direction.

In the embodiment, the second light shielding portion 34 is constituted by a plurality of slits 341 (second hole portion) provided at predetermined intervals along the outer periphery of the first hole portion 31 and a light shielding member 342 filled in the slit 341 and having a higher light shielding property than the wiring substrate 3. In the embodiment, each slit 341 is provided by penetrating the wiring substrate 3. In addition, for the light shielding member 342, for example, a silicone resin, a dark color (e.g., black) resist, or the like is used.

According to this configuration, light traveling from the outside of the second light shielding portion 34 toward the first hole portion 31 inside the wiring substrate 3 may be shielded, for example, by refracting the light by the slit 341. In addition, the light may also be shielded by the light shielding member 342 filled in the slit 341. In this way, the amount of light traveling toward the first hole portion 31 may be reduced.

In addition, a dimension D1 (predetermined interval) between the slits 341 is set to be shorter than the shortest value of the wavelength range of the light received by the light receiving element 11. According to this configuration, due to the optical characteristics, the amount of light traveling from the outside of the second light shielding portion 34 to the first hole portion 31 through between the slits 341 may also be reduced within the wiring substrate 3.

Operational Effect of the Second Embodiment

In the embodiment, the wiring substrate 3 includes the second light shielding portion 34 on the outer peripheral side of the wiring substrate 3 with respect to the first hole portion 31 in the substrate plan view. Therefore, it is possible to suppress the light traveling from the outside of the second light shielding portion 34 toward the first hole portion 31 by the second light shielding portion 34 inside the wiring substrate 3, thereby suppressing the light from reaching the first hole portion 31. In this way, it is possible to suppress the light that passes through the inside of the wiring substrate 3 and is emitted into the first hole portion 31 from entering the light passing through the inside of the first hole portion 31 along the optical axis L1, thereby improving the measurement accuracy of the amount of received light.

In addition, in the embodiment, since the second light shielding portion 34 is provided so as to surround the periphery of the first hole portion 31, it is possible to suppress the light traveling from the outer periphery of the wiring substrate 3 toward the first hole portion 31 from reaching the first hole portion 31 more reliably.

In addition, in the embodiment, the dimension D1 between the slits 341 is set to be shorter than the shortest value of the wavelength range of the light received by the light receiving element 11. According to this configuration, due to the optical characteristics, the amount of light traveling from the outside of the second light shielding portion 34 to the first hole portion 31 through between the slits 341 may be reduced within the wiring substrate 3.

In addition, in the embodiment, since the slit 341 penetrates through the wiring substrate 3, as compared with the case where the slit 341 does not penetrate through the wiring substrate 3, for example, light traveling from the outside of the second light shielding portion 34 toward the first hole portion 31 may be shielded by the slit 341 and the light shielding member 342 inside the wiring substrate 3 more reliably.

Other Embodiments

The invention is not limited to each of the above-described embodiments, and variations, improvements, and the like within the scope of achieving the object of the invention are included in the invention.

For example, in each of the above embodiments, the optical modules 10 and 10A include the spectroscopic device 5, but the invention is not limited thereto.

For example, the spectroscopic device 5 may not be included, and the light receiving element 11 may be configured to directly receive light along the optical axis L1.

In each of the above embodiments, the optical modules 10 and 10A include the light receiving element 11 as an optical element, but the invention is not limited thereto.

The optical element may be a light emitting element such as an LED or a spectroscopic element. Also, in this case, it is possible to suppress the light that passes through the inside of the wiring substrate 3 and is emitted to the first hole portion 31 from entering into the light along the optical axis L1, thereby improving the optical accuracy of the optical module.

In each of the above embodiments, the optical modules 10 and 10A are configured to include the spectroscopic device 5, the light receiving element 11, and the filter driving unit 13, but is not limited thereto.

For example, the optical modules 10 and 10A may be configured to include the spectroscopic device 5 and the light receiving element 11. Alternatively, the optical modules 10 and 10A may be configured to include the spectroscopic device 5, the light receiving element 11, the filter driving unit 13, and the signal processing unit 12. In this case, the signal processing unit 12 is constituted by a control circuit provided on the wiring substrate 3.

In the above embodiments, the first hole portion 31 is a through hole that penetrates through the wiring substrate 3, but is not limited thereto. For example, the first hole portion 31 may be a concave portion having an opening surface on the side of the first surface 32. In this case, the light receiving element 11 is provided in the concave portion.

In the second embodiment, the slits 341 are provided in one row along the outer periphery of the first hole portion 31 in the substrate plan view, but the invention is not limited thereto.

Figure 6:
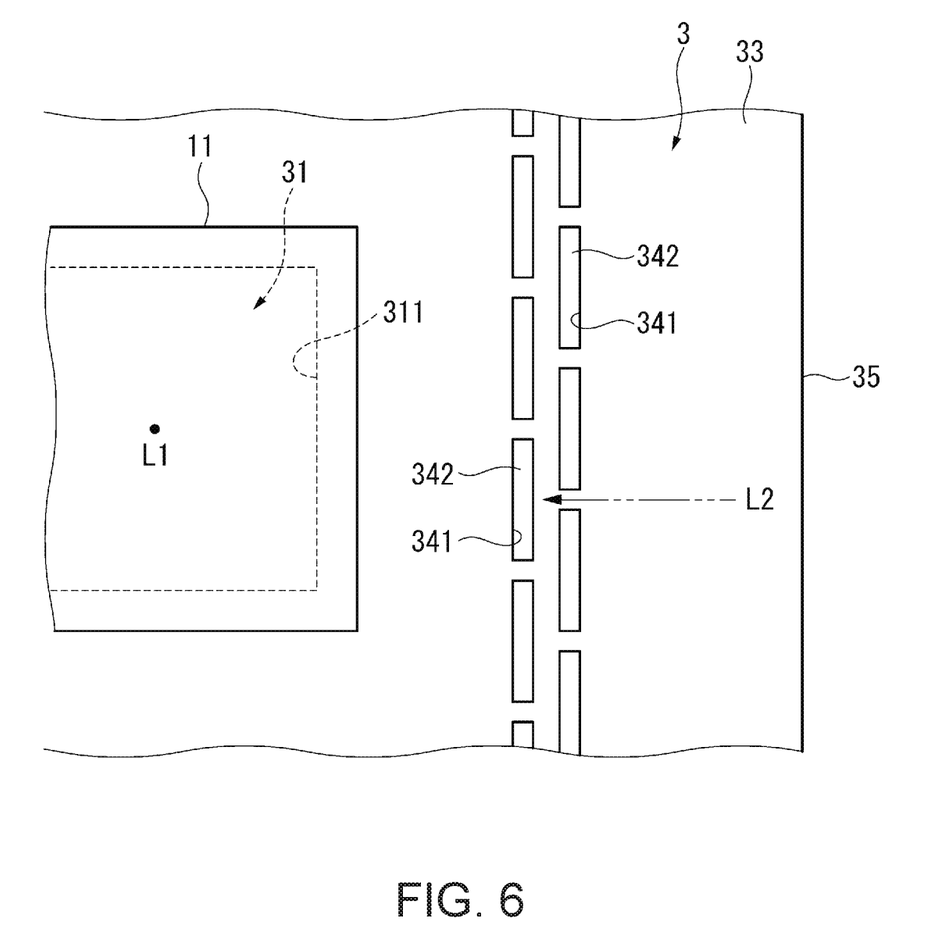
FIG. 6 is a partial plan view of an optical module according to another embodiment of the invention.

For example, the slits 341 may be provided in two rows along the outer periphery of the first hole portion 31 as shown in FIG. 6. Alternatively, the slits 341 may be provided in three or more rows.

In this case, as shown in FIG. 6, when viewed from the direction of light L2 traveling from the outside of the slit 341 toward the first hole portion 31, it is preferable that the outer slit 341 and the inner slit 341 are arranged so as to be displaced from each other so that the slits 341 in the inner row overlap between the slits 341 in the outer row.

According to this configuration, since light passing through between the slits 341 in the outer row may be shielded by the slits 341 in the inner row and the light shielding member 342, light traveling from the outside of the second light shielding portion 34 toward the first hole portion 31 may be shielded by the second light shielding portion 34 more reliably.

In the second embodiment, the slit 341 penetrates through the wiring substrate 3, but is not limited thereto. For example, the slit 341 may be a concave portion having an opening surface on the first surface 32 side or the second surface 33 side of the wiring substrate 3.

For example, both of the concave portion having an opening surface on the first surface 32 side and the concave portion having an opening surface on the second surface 33 side may be provided on the wiring substrate 3. For example, the wiring substrate 3 is provided with a first concave portion surrounding the periphery of the first hole portion 31 and a second concave portion surrounding the first concave portion outside the first concave portion in the substrate plan view. One of the first concave portion and the second concave portion is formed as a concave portion having an opening surface on the first surface 32 side and the other is formed as a concave portion having an opening surface on the second surface 33 side. In this manner, light passing through between the bottom of the second concave portion and the surface opposite to the opening surface in the wiring substrate 3 toward the first hole portion 31 may be shielded by the first concave portion and the light shielding member 342 filled in the first concave portion, thereby reducing the light travelling toward the first hole portion 31 more reliably.

In the second embodiment, the light shielding member 342 is provided inside the slit 341, but the invention is not limited thereto. That is, the light shielding member 342 may not be provided in the slit 341.

Figure 7:
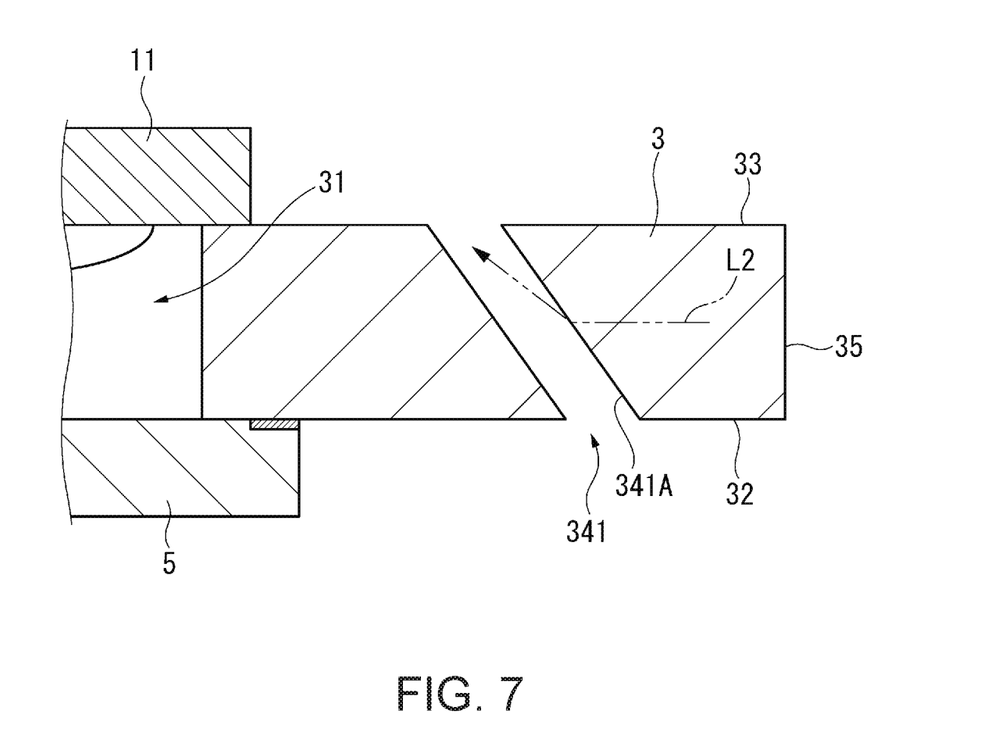
FIG. 7 is a partial cross-sectional view of an optical module according to still another embodiment of the invention.

In this case, for example, as shown in FIG. 7, by inclining an inner surface 341A of the slit 341 with respect to the thickness direction of the wiring substrate 3, the light L2 that has passed through the inside of the wiring substrate 3 from the outside of the slit 341 toward the first hole portion 31 may be effectively refracted by the inner surface 341A and the amount of light travelling toward the first hole portion 31 may be further reduced.

In addition, by setting the width dimension of the slit 341, that is, the dimension in the direction from the outside of the slit 341 to the first hole portion 31 shorter than the shortest value of the wavelength range of the light received by the light receiving element 11, it is possible to reduce the amount of light travelling from the outside of the slit 341 toward the first hole portion 31 through the slit 341 due to the optical characteristics.

In the second embodiment, the second light shielding portion 34 is constituted by a plurality of slits 341, but is not limited thereto.

For example, the second light shielding portion 34 may be constituted by a single continuous slit along the outer periphery of the first hole portion 31. In this case, however, it is preferable that the slit is a concave portion which does not penetrate through the wiring substrate 3 in order to prevent the wiring substrate 3 from being divided by the slit.

In addition, the second light shielding portion 34 may be constituted by a plurality of holes formed in a circular shape, an elliptic shape, a square shape, or the like in the substrate plan view.

In addition, the second light shielding portion 34 may be provided by forming a part of the wiring substrate 3 with a different material having a high light shielding property without providing a slit or the like.

In the second embodiment, the second light shielding portion 34 is provided so as to surround the periphery of the first hole portion 31, but is not limited thereto.

For example, the second light shielding portion 34 may not be provided in a portion of the wiring substrate 3 where light traveling toward the first hole portion 31 is small.

In the second embodiment, a light shielding portion is not provided on the inner peripheral surface 311 of the first hole portion 31, but the first light shielding portion 4 may be provided on the inner peripheral surface 311 as in the first embodiment. In this way, it is possible to reduce the amount of light that passes through the inside of the wiring substrate 3 and is emitted into the first hole portion 31 more reliably.

The entire disclosure of Japanese Patent Application No. 2017-160892 filed Aug. 24, 2017 is expressly incorporated by reference herein.

What is claimed is:
1. An optical module comprising:
a substrate, the substrate having:
a first surface having a first opening therein;
a second surface outwardly opposite to the first surface, the second surface having a second opening therein; and
an enclosing surface defining a through hole in the substrate, the through hole connecting between the first opening and the second opening;
a first light shielding layer covering the enclosing surface to define a shielded through hole in the substrate, the shielded through hole connecting between the first opening and the second opening, the first light shielding layer having a higher light shielding property than the substrate; and
an optical element provided on the first surface of the substrate, the optical element covering the first opening, the optical element being configure to receive light entering the shielded through hole from the second opening.

2. The optical module according to claim 1,
wherein the substrate is provided between the first surface and the second surface on the outer peripheral side of the substrate with respect to the first hole portion in a plan view as viewed from the thickness direction and includes a second light shielding portion that shields light in a direction intersecting with the thickness direction.

3. The optical module according to claim 2,
wherein the second light shielding portion is provided to surround the periphery of the first hole portion in the plan view.

4. The optical module according to claim 2,
wherein the second light shielding portion includes a second hole portion having an opening surface on at least one of the first surface and the second surface of the substrate.

5. The optical module according to claim 4,
wherein the second light shielding portion includes a plurality of the second hole portions arranged at predetermined intervals.

6. The optical module according to claim 4,
wherein the second hole portion is provided with a light shielding member having a higher light shielding property than the substrate.

7. The optical module according to claim 4,
wherein the second hole portion penetrates the substrate.

8. An electronic apparatus comprising:
the optical module according to claim 1; and
a controller that controls the optical module.

9. An electronic apparatus comprising:
the optical module according to claim 2; and
a controller that controls the optical module.

10. An electronic apparatus comprising:
the optical module according to claim 3; and
a controller that controls the optical module.

11. An electronic apparatus comprising:
the optical module according to claim 4; and
a controller that controls the optical module.

* * * * *